United States Patent [19]

Kurata et al.

[11] Patent Number: 4,547,655
[45] Date of Patent: Oct. 15, 1985

[54] ELECTRICALLY HEATED STEERING WHEEL

[75] Inventors: Hidenori Kurata, Zama; Kazuo Inaba, Fuji; Tomokazu Sugiyama, Fuji; Tomio Hirata, Fuji, all of Japan

[73] Assignee: Nissan Motor Co., Ltd., Yokohama, Japan

[21] Appl. No.: 545,361

[22] Filed: Oct. 25, 1983

[30] Foreign Application Priority Data

Nov. 2, 1982 [JP] Japan .................. 57-191781

[51] Int. Cl.⁴ .......................... H05B 3/16; B62D 1/06
[52] U.S. Cl. ................................. 219/204; 74/552; 219/535; 219/543
[58] Field of Search ............ 219/204, 543, 547, 535, 219/522; 74/552

[56] References Cited

FOREIGN PATENT DOCUMENTS 48-110823 of 1973 Japan .

Primary Examiner—A. Bartis
Attorney, Agent, or Firm—Leydig, Voit & Mayer

[57] ABSTRACT

In a steering wheel mounted heater, there is provided a heat conductive sheet directly in contact with the outer surface of the rim portion. This conductive sheet is then intimately covered first with an electrically insulating sheet and secondly with an electrically heat generating member. This configuration is provided in order to quickly achieve uniform temperature distribution on a given zone of the steering wheel which zone is most likely gripped by the driver during the vehicle driving.

11 Claims, 12 Drawing Figures

ELECTRICALLY HEATED STEERING WHEEL

BACKGROUND OF THE INVENTION

1. Field of the Invention

The present invention relates in general to a steering wheel of a motor vehicle, and more particularly to a heater-mounted steering wheel which is electrically warmed to a suitable degree to give the driver a comfortable feeling.

2. Description of the Prior Art

In order to give the driver a comfortable feeling when handling the steering wheel in cold weather, there has been proposed a steering wheel the rim portion of which is warmed to a suitable degree by an electric heater mounted in the rim portion.

However, as will become apparent as the description proceeds, the known electrically heated steering wheels have a drawback in failing to provide the one of the steering wheel most likely gripped by the driver while driving with uniform temperature distribution there-throughout. That is, the rim portion of known electrically heated steering wheels tends to have an extremely high temperature zone at the portion where the terminal ends of the electric heater are located, especially during starting of electric energization of the heater. Of course, this phenomenon is a source of discomfort.

SUMMARY OF THE INVENTION

An object of the present invention is therefore, to provide an improved electrically heated steering wheel which is free of the above-mentioned drawback. That is, in accordance with the present invention, there is provided an improved electrically heated steering wheel in which a given zone of the rim portion is uniformly warmed a short time after start of energization of the electric heater mounted in the steering wheel.

According to the present invention, there is provided an electrically heated steering wheel having a rim portion, a heat conductive sheet intimately covering the outer surface of the rim portion, an electrically insulating sheet intimately covering the heat conductive sheet, an electric heat generating member intimately covering the outer surface of the electrically insulating sheet, the heat generating member generating heat when electrically energized, and an outermost cover wrapped around the electric heat generating member.

DESCRIPTION OF THE DRAWINGS

Objects and advantages of the present invention will become apparent from the following description when taken in conjunction with the accompanying drawings, in which.

DESCRIPTION OF THE PRIOR ART

Prior to describing in detail the present invention, two prior art electrically heated steering wheels will be described with reference to FIGS. 1-4 in order to clarify the invention, which steering wheels are disclosed in Japanese Utility Model Application First Publication No. Sho 48-110823.

Figure 1:
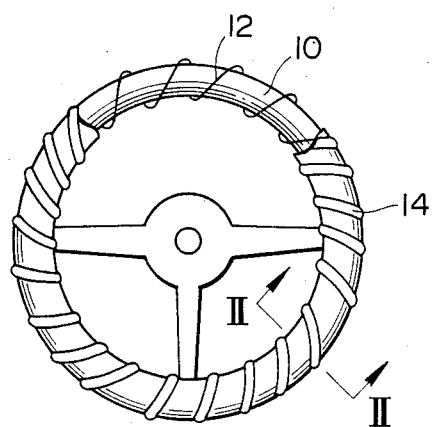
FIG. 1 is a partially broken away plan view of a conventional electrically heated steering wheel.
Figure 2:
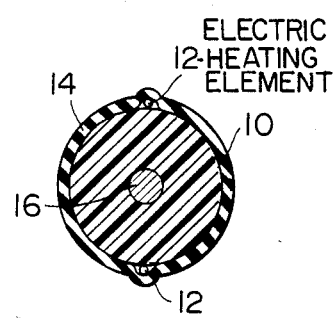
FIG. 2 is an enlarged sectional view taken along the line II—II of FIG. 1.

Referring to FIGS. 1 and 2, there is shown one of the prior art electrically heated steering wheels, which comprises generally a rim portion 10 of the steering wheel, an electric heat generating wire 12 (or heater wire) sprirally wound around the rim portion 10, and an electrically insulating sheet 14 covering both the rim portion 10 and the heater wire 12. Designated by numeral 16 is a metal core of the rim portion 10. Although not shown in the drawings, the heater wire 12 has terminal ends which are connected to an electric power source through known electric lead wires and a switch means.

Figure 3:
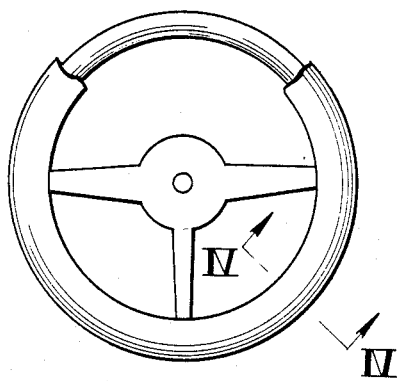
FIG. 3 is a partially broken away plan view of another conventional electrically heated steering wheel.
Figure 4:
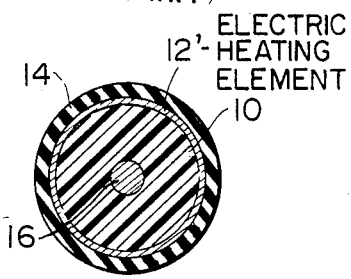
FIG. 4 is an enlarged sectional view taken along the line IV—IV of FIG. 3.

Referring to FIGS. 3 and 4, there is shown another prior art steering wheel, which comprises generally a rim portion 10 of the steering wheel, an electric heat generating sheet 12' (or heater sheet) covering the entire of the rim portion 10, and an electrically insulating sheet 14 covering the heater sheet 12'. Similar to the steering wheel of FIGS. 1 and 2, the heater sheet 12' has terminal ends which are connected to the electric power source through known electric lead wires and a switch means.

Upon closing the switch means, the heater wire 12 (or heater sheet 12') is electrically energized to generate heat thereby warming the rim portion 10 of the steering wheel.

However, the above-mentioned two prior art steering wheels have a drawback that production of heat at the terminal ends of the heater wire 12 (or heater sheet 12') is extremely high as compared with that at the intermediate portion of the heater wire 12 (or heater sheet 12') because of higher electric resistance at the terminal ends. This phenomenon will be understood from the graph of FIG. 12 which shows the temperature change at given portions of the heater-mounted steering wheel with respect to time elapsed. That is, the curve indicated by reference "a" shows the temperature change at the portion where the intermediate portion of the heater wire 12 is located, while, the other curve indicated by reference "b" shows the temperature change at the portion where one of the terminal ends of the heater wire 12 is located. The undesirable phenomenon is mainly caused by the connection of the terminal ends with the electric lead wires. Thus, in theory, this drawback can be overcome by providing a heater wire (or heater sheet) which has terminal ends of which electric resistance is lower than that of the major portion thereof. However, such heater wire (or heater sheet) is not practical when considering the difficulty in manufacturing it at low cost.

Thus, when the steering wheels of the types described hereinabove are used the driver is compelled to touch or grip the zone of the wheel which is nonuniformly warmed therethroughout, so that he or she feels uncomfortable when driving. Furthermore, since the production of heat at the intermediate portion of the heater wire 12 is not sufficient, it takes a long time to increase the temperature of the zone of the rim portion, where the intermediate portion of the heater wire 12 is located, to a desired comfortable value.

DETAILED DESCRIPTION OF THE PRESENT INVENTION

Referring to FIGS. 5 to 8, there is shown an electrically heated steering wheel of a first embodiment of the present invention which is free of the above-stated drawback encountered in the conventional steering wheels.

Figure 5:
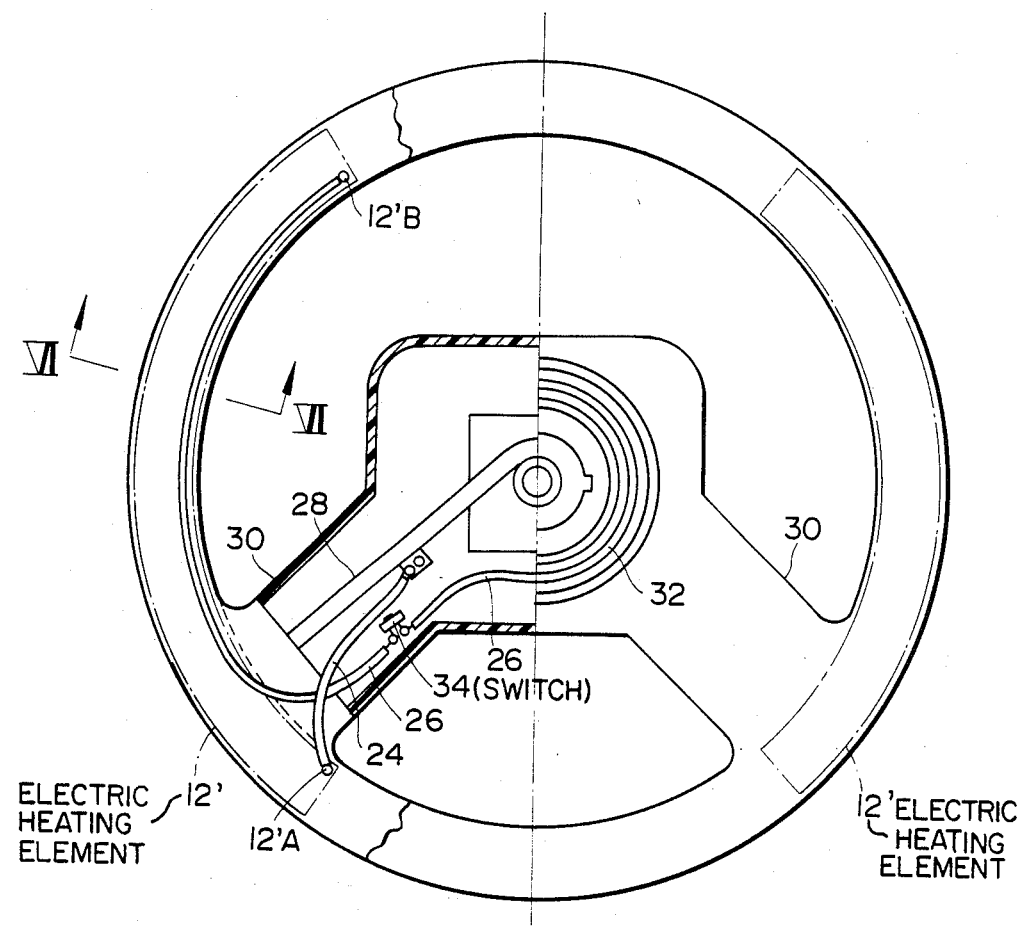
FIG. 5 is a partially broken away plan view of an electrically heated steering wheel of a first embodiment of the present invention, the right half of the drawing showing the exterior appearance of the steering wheel, while, the left half of the drawing showing the interior appearance of the same.
Figure 6:
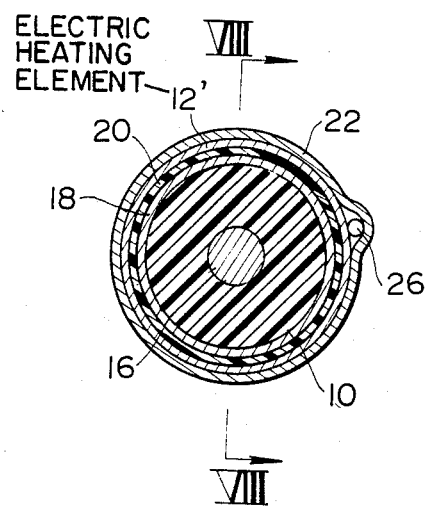
FIG. 6 is an enlarged sectional view taken along the line VI—VI of FIG. 5.
Figure 7:
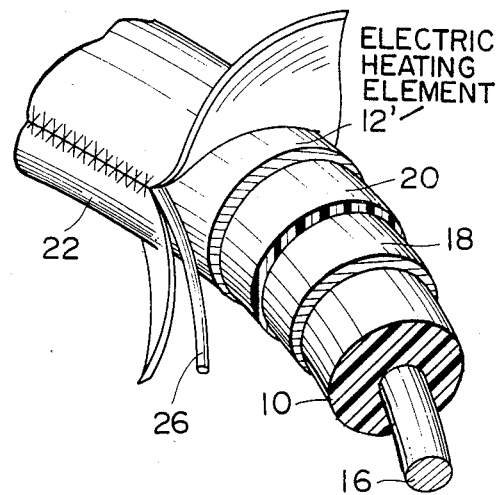
FIG. 7 is a perspective view of the rim portion of the steering wheel of FIG. 5, the rim portion being shown stripped for clarification of the parts used therein.
Figure 8:
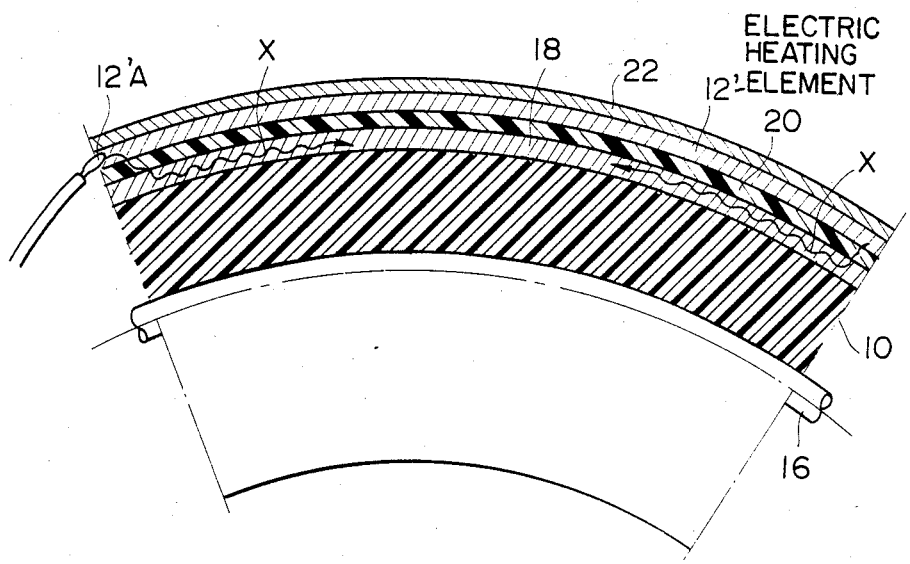
FIG. 8 is an enlarged fragmentary sectional view taken along the line VIII—VIII of FIG. 6, which is presented for explaining heat transmittance occurring in the rim portion of the steering wheel.

As is clearly shown in FIGS. 6 and 7, the electrically heated steering wheel of the first embodiment comprises a rim portion 10 of the steering wheel which has a metal core 16 embedded therein. A high heat conductive sheet 18 such as a copper film, an aluminium film or the like covers intimately the rim portion 10 and, as shown in FIGS. 6–8, is in direct contact with the rim. If desired, such metal film may be deposited to the rim portion 10 by a metal vaporization technique. An electrically insulating sheet 20, such as a plastic film (for example, polyamide plastics, olefine group plastics or the like) covers the heat conductive sheet 18, intimately. As is seen from FIG. 5, two electric heat generating sheets 12' cover two spaced limited portions of the electrically insulating sheet 20. The limited portions are portions on the rim portion 10 which are most likely gripped by the driver during driving. If the electrically insulating sheet 20 is constructed of a thermoplastic film, such as a polyamide plastic film, the insulating sheet 20 and the heat generating sheets 12' can be bonded to each other to form a one-piece article by employing a hot-press bonding technique. Employing this process can facilitate the assembling of the furnished steering wheel. An outermost cover 22 made of a woven fabric, leather or the like covers the heat generating sheets 12' as well as the remaining portion of the electrically insulating sheet 20.

As is seen from FIG. 5, two lead wires 24 and 26 are respectively connected to the terminal ends of each electrically heat generating sheet 12'. One lead wire 24 leads to a metal core 28 of one of the spokes 30 of the steering wheel. The metal core 28 of each spoke 30 is grounded and connected to the negative terminal of a DC-power source (battery) mounted in the vehicle. The other lead wire 26 is connected to a known slip ring 32 through a switch 34 mounted on the spoke 30. The slip ring 32 is mounted on the hub portion of the steering wheel and constructed to maintain electrical connection between the lead wire 26 and the positive terminal of the electric source even under rotation of the steering wheel.

When, in operation, the switch 34 is closed, the heat generating sheets 12' are electrically energized to generate heat thereby to warm the steering wheel gradually. Similar to the case of the aforementioned conventional steering wheels, the production of heat at the terminal ends 12'A and 12'B of the heat generating sheets 12' is greater than that of the intermediate portion of the same because of higher electric resistance at the terminal ends 12'A and 12'B. However, in the present invention, the nonuniformly heat distribution on each heat generating sheet 12' is compensated or minimized by the presence of the high heat conductive sheet 18. That is, the excessive heat at the terminal ends 12'A and 12'B is quickly transmitted to the heat conductive sheet 18 and travels quickly in the sheet 18 toward the intermediate portion of it in a manner as indicated by the arrows X of FIG. 8. By the addition of heat given from the heat conductive sheet 18, the intermediate portion of each heat generating sheet 12' has a higher temperature than that gained by only electrically energizing that intermediate portion. Thus, in a short time, each heat generating sheet 12' has a uniform heat distribution has throughout, so that the given zones of the steering wheel where the heat generating sheets 12' are embedded are uniformly warmed. This provides the driver with a comfortable touch or gripping feeling.

Figure 11:
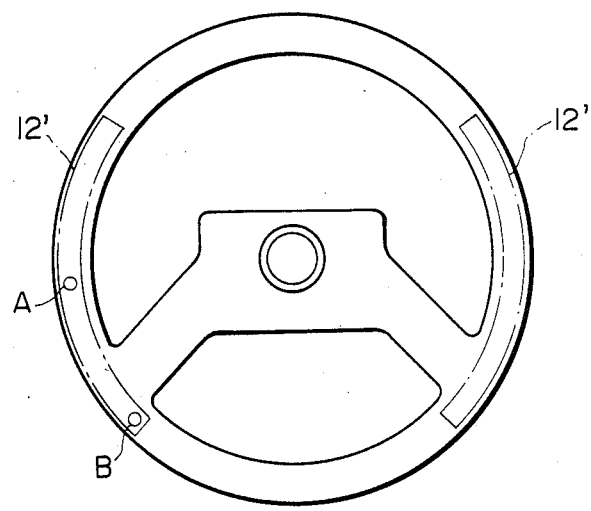
FIG. 11 is a plan view of the electrically heated steering wheel of the first embodiment, indicating two portions A and B of which temperatures are to be measured for testing the performance of the heater arrangement mounted on the steering wheel proper.
Figure 12:
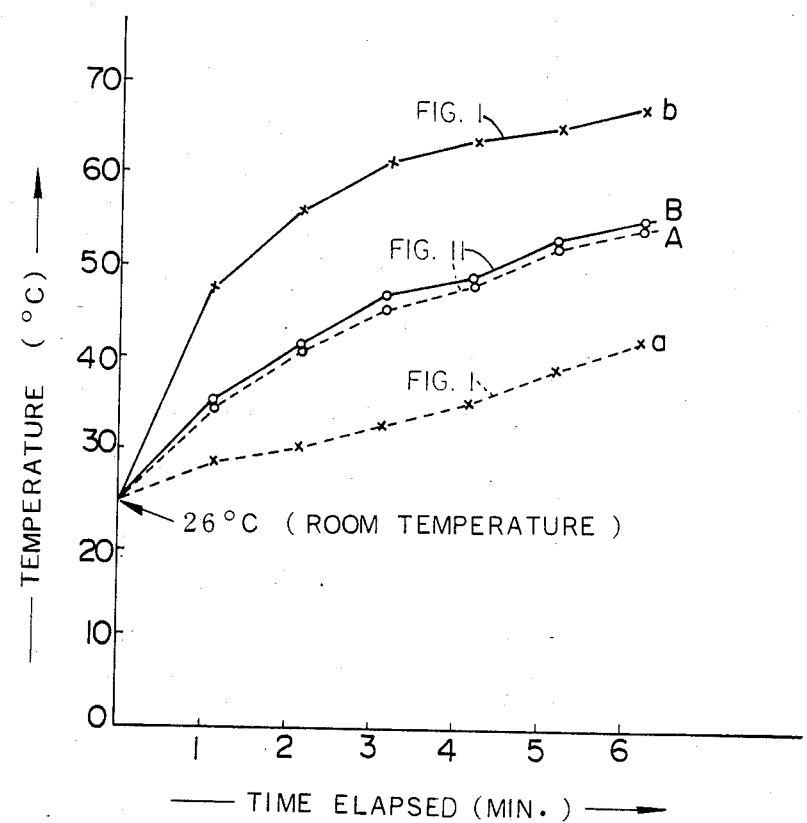
FIG. 12 is a graph plotting the temperatures of the two portions A and B of FIG. 11 with respect to time elapsed, the temperatures of the corresponding portions of the conventional electrically heated steering wheel of FIGS. 1 and 2 being also plotted for comparison with the result of the present invention.

This advantageous phenomenon may be clearly understood from the graph of FIG. 12 which shows the temperature change at the portions "A" and "B" in FIG. 11 of the outermost cover 22 with respect to time elapsed, and the temperature change of corresponding portions "a" and "b" of a conventional steering wheel of FIGS. 1 and 2. The portion "A" is the portion where the intermediate portion of the heat generating sheet 12' is located, while, the portion "B" is the portion where one terminal end 12'A is located. As is seen, the curves "A" and "B" which indicate the temperature change at the portions "A" and "B" of FIG. 11 show generally identical characteristics, demonstrating the uniform heat distribution on the two limiting portions of the steering wheel which are most likely gripped by the driver the the driving.

Of course, in place of the electrically heat generating sheets 12' mentioned hereinabove, known Nichrome wires may be employed, which are spirally wound around the corresponding portions of the electrically insulating sheet 20.

Furthermore, if the rim portion 10 of the steering wheel is constructed of heat insulating material such as foamed polyurethane, the heat transmittance in the heat conductive sheet 18 is more effectively achieved because the heat transmittance therefrom to the rim portion 10 is minimized.

Figure 9:
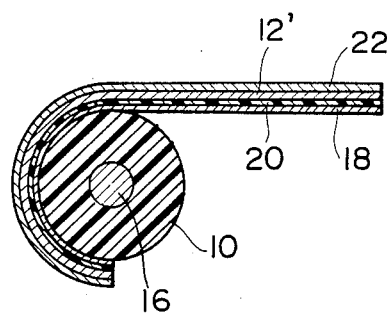
FIG. 9 is a sectional view of the rim portion of an electrically heated steering wheel of a second embodiment of the present invention, the rim portion being shown stripped for easy understanding of its construction.

Referring to FIG. 9, there is shown a second embodiment of the present invention. The electrically heated steering wheel of this second embodiment comprises a laminated article which is wrapped around and bonded to the rim portion 10 of the steering wheel. The laminated article comprises a heat conductive sheet 18, an electrically insulating sheet 20, an electric heat generating sheet 12' and an outermost cover 22 all of which are bonded to one another in this order by means of adhesive materials and/or hot-press bonding technique prior to being assembled to the rim portion. In this second embodiment, the assembling of the steering wheel is facilitated.

Figure 10:
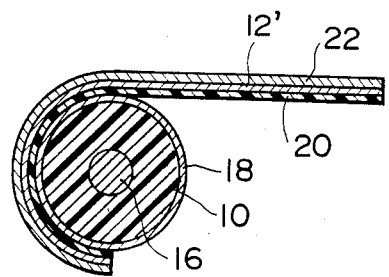
FIG. 10 is a view similar to FIG. 9, but showing a third embodiment of the present invention.

Referring to FIG. 10, there is shown a third embodiment of the present invention. In this third embodiment, a metal layer 18 acting as the heat conductive sheet 18 is first deposited on the rim portion 10 of the steering wheel by means of a metal vaporization technique. A laminated article comprising an electrically insulating sheet 20, an electrically heat generating sheet 12' and an outermost cover 22 all of which are bonded to one another in this order is wrapped around and bonded to the deposited metal layer 18. Also in this third embodiment, the assembling of the steering wheel is facilitated. As shown in FIGS. 9 and 10, the heat generating sheet 18 is in direct contact with the rim.

As is stated in the foregoing description, in accordance with the present invention, there is employed a heat conductive member which extends near and along the heat generating sheet 12' in order to quickly and effectively transmit the excessive heat generated at the terminal ends of the heat generating sheet 12' to the intermediate portion of the same where production of heat effected by electrically energizing that intermediate portion is relatively small. Thus, in the invention, the two limited zones of the steering wheel which are most likely gripped by the driver during the driving are uniformly and quickly warmed thereby giving the driver a comfortable touch or gripping feeling.

What is claimed is:

1. An electrically heated steering wheel comprising a rim portion adapted to be gripped by the driver's hands;
   a heat conductive metallic sheet intimately covering and in direct contact with the outer surface of said rim portion;
   an electrically insulating sheet intimately covering the outer surface of said heat conductive metallic sheet;
   an electric heat generating member intimately covering the outer surface of said electrically insulating sheet, said electric heat generating member generating heat when electrically energized, said heat generating member having a pair of longitudinally spaced terminals adapted to be connected to a source of electric power;
   an outermost, electrically insulative cover wrapped around said rim portion in a manner to dispose therebetween said heat conductive metallic sheet, said electrically insulating sheet and said electric heat generating member.

2. An electrically heated steering wheel as claimed in claim 1, said electric heat generating member having two spaced terminal ends defining said spaced terminals, and two lead wires connected to said terminal ends and adapted to energize said member from an electric power source.

3. An electrically heated steering wheel as claimed in claim 2, said two terminal ends of said electric heat generating member being the opposite ends of said electric heat generating member.

4. An electrically heated steering wheel as claimed in claim 3, said electric heat generating member being arranged on only a limited portion of the rim portion, said limited portion being a portion which is most likely gripped by one of the driver's hands.

5. An electrically heated steering wheel as claimed in claim 3, said electric heat generating member being arranged on only a pair of spaced, limited portions of the rim portion, said spaced limited portions being those portions most likely to be gripped by the driver's hands.

6. An electrically heated steering wheel as claimed in claim 2, said steering wheel having a spoke portion with a metal core connected to one of said lead wires, a slip ring and a switch mounted on the spoke portion and connected to the other lead wire, said slip ring being mounted on the hub portion of the steering wheel and constructed to maintain electric connection between said other lead wire and the electric power source during rotation of the steering wheel.

7. An electrically heated steering wheel as claimed in claim 1 in which said heat conductive metallic sheet is selected from a group consisting of a copper film and an aluminum film.

8. An electrically heated steering wheel as claimed in claim 1, in which said electrically insulating sheet is a plastic film.

9. An electrically heated steering wheel as claimed in claim 1, in which said heat conductive metallic sheet is vapor deposited directly on said rim portion.

10. An electrically heated steering wheel as claimed in claim 1 in which said sheets are coextensive with said member and substantially surround the entire cross-sectional perimeter of said rim portion.

11. An electrically heated steering wheel as claimed in claim 1, in which said heat conductive metallic sheet and said electrically insulating sheet are coextensive with said electric heat generating member.

* * * * *

UNITED STATES PATENT AND TRADEMARK OFFICE
CERTIFICATE OF CORRECTION

PATENT NO.   :   4,547,655
DATED        :   October 15, 1985
INVENTOR(S)  :   KURATA ET AL It is certified that error appears in the above-identified patent and that said Letters Patent is hereby corrected as shown below:

On face of patent with information pertaining to "Assignee", insert --and NIHON PLAST CO., LTD., Fuji City, Japan--.

Signed and Sealed this

First Day of April 1986

[SEAL]

Attest:

DONALD J. QUIGG

Attesting Officer

Commissioner of Patents and Trademarks